(12) United States Patent
Todd et al.

(10) Patent No.: US 6,918,445 B2
(45) Date of Patent: Jul. 19, 2005

(54) METHODS AND COMPOSITIONS FOR TREATING SUBTERRANEAN ZONES USING ENVIRONMENTALLY SAFE POLYMER BREAKERS

(75) Inventors: Bradley L. Todd, Duncan, OK (US); Keith A. Frost, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 185 days.

(21) Appl. No.: 10/418,467

(22) Filed: Apr. 18, 2003

(65) Prior Publication Data

US 2004/0216875 A1 Nov. 4, 2004

(51) Int. Cl.⁷ .............................................. E21B 37/06
(52) U.S. Cl. ................... 166/279; 166/300; 166/305.1; 166/312; 507/209; 507/211; 507/213; 507/214; 507/215; 507/216; 507/273; 507/922
(58) Field of Search .................. 166/279, 300, 166/304, 305.1, 310–312, 371, 372; 507/209, 211, 213–216, 273, 922

(56) References Cited

U.S. PATENT DOCUMENTS

| | | | |
|---|---|---|---|
| 5,184,679 A | * | 2/1993 | Lau ............................. 166/278 |
| 5,460,226 A | | 10/1995 | Lawson et al. .............. 166/300 |
| 6,138,760 A | | 10/2000 | Lopez et al. ................. 166/300 |

FOREIGN PATENT DOCUMENTS

GB  2 383 597 A  7/2003  ........... E21B/43/26

OTHER PUBLICATIONS

Foreign communication from a related counterpart application dated Aug. 16, 2004.

* cited by examiner

*Primary Examiner*—Zakiya Walker
(74) *Attorney, Agent, or Firm*—Robert A. Kent; C. Clark Dougherty, Jr.

(57) ABSTRACT

Methods and compositions for treating subterranean zones penetrated by well bores utilizing environmentally safe viscous fluids including a solubility increasing boron complex or ester forming compound. A method of the invention comprises the following steps. A viscous treating fluid composition is provided comprising water, a viscosity increasing polymer and a water soluble delayed polymer breaker that comprises a mixture of sodium perborate tetrahydrate and a solubility increasing boron complex or ester forming compound. The viscous treating fluid composition is introduced into the subterranean zone wherein the viscous treating fluid is allowed to break into a thin fluid of reduced viscosity.

42 Claims, No Drawings

METHODS AND COMPOSITIONS FOR TREATING SUBTERRANEAN ZONES USING ENVIRONMENTALLY SAFE POLYMER BREAKERS

BACKGROUND OF THE INVENTION

1. Field of the Invention

The present invention relates to methods and compositions for treating subterranean zones in formations penetrated by well bores utilizing environmentally safe polymer breakers.

2. Description of the Prior Art

Treating fluids that contain polymer breakers are used in a variety of operations and treatments in oil and gas wells. The treatments include well completions and production stimulation treatments. An example of a well completion treatment which utilizes a polymer breaker in a high viscosity fluid is known in the art as gravel packing. In gravel packing treatments, solid gravel particles such as sand are carried by way of the well bore to a subterranean zone in which a gravel pack is to be placed by a viscous gelled carrier fluid. That is, particulate solids (referred to in the art as gravel) are suspended in the high viscosity carrier fluid at the surface and carried to the subterranean zone in which the gravel pack is to be placed. Once the gravel is placed in the zone, the viscous carrier fluid is broken (the viscosity is reduced) and recovered (returned to the surface) by including a delayed polymer breaker, i.e., a viscosity reducing agent, in the carrier fluid. The gravel pack produced functions as a filter to separate formation solids from produced fluids while permitted the produced fluids to flow into and through the well bore.

In open hole gravel packing procedures, a non-viscous carrier fluid can be used that includes a polymer breaker which breaks down drill-in fluid filter cake left on the walls of the open hole well bore from the well bore drilling operation. The carrier fluid for open hole gravel packing can also be viscosified. In that case, the delayed breaker in the carrier fluid breaks the carrier fluid and the filter cake so that the carrier fluid and the filter cake can be removed from the subterranean zone.

An example of a production stimulation treatment utilizing a polymer breaker in a viscous gelled fluid is hydraulic fracturing. That is, a viscous fluid, referred to in the art as a fracturing fluid, is pumped through the well bore into a subterranean zone to be stimulated at a rate and pressure such that fractures are formed and extended into the subterranean zone. The fracturing fluid also carries particulate solids, referred to in the art as proppant particles, into the fractures. The proppant particles are suspended in the viscous fracturing fluid so that the proppant particles are carried into the fractures. The proppant particles function to prevent the fractures from closing whereby conductive channels are formed through which produced fluids can flow to the well bore.

After the viscous fracturing fluid has been pumped into a subterranean zone and fracturing of the zone has taken place, the proppant particles are deposited and the fracturing fluid is removed from the zone to allow produced hydrocarbons to flow through the propped fractures. Generally, the deposition of the proppant particles and the removal of the viscous fracturing fluid are accomplished by converting the fracturing fluid to a low viscosity fluid. This conversion of the fracturing fluid is brought about by including a delayed polymer breaker in the fracturing fluid prior to pumping it into the subterranean zone.

Sodium perborate tetrahydrate which is environmentally safe has been utilized heretofore for breaking viscous fluids. However, in gravel packing treatments, fracturing treatments and other treatments wherein fresh water and salt water based fluids are utilized, sodium perborate tetrahydrate often has limited solubility in the fluids. Thus, there is a need for environmentally safe delayed polymer breakers containing sodium perborate tetrahydrate which are more soluble in fresh water and salt water.

SUMMARY OF THE INVENTION

The present invention provides improved methods and compositions for treating subterranean zones using environmentally safe water based treating fluids which contain delayed water soluble polymer breakers that meet the need described above and overcome the deficiencies of the prior art. A method of the invention is basically comprised of the following steps. A water based viscous treating fluid composition is provided comprising water, a viscosity increasing polymer and an environmentally safe water soluble delayed polymer breaker that comprises a mixture of sodium perborate tetrahydrate and a solubility increasing boron complex or ester forming compound. The viscous treating fluid composition is introduced into a subterranean zone by way of a well bore penetrating it and the delayed polymer breaker is allowed to break the viscous treating fluid into a thin fluid of reduced viscosity. Thereafter, the treating fluid can be recovered from the subterranean zone.

Another method of this invention is comprised of the following steps. A water based non-viscous treating fluid composition is provided comprising water and an environmentally safe water soluble delayed polymer breaker that comprises a mixture of sodium perborate tetrahydrate and a solubility increasing boron complex or ester forming compound. The treating fluid composition is introduced into a subterranean zone by way of an open hole well bore penetrating it that has filter cake on the walls thereof. The delayed polymer breaker in the treating fluid composition is then allowed to break the filter cake. Thereafter, the treating fluid and broken filter cake can be removed from the subterranean zone.

Yet another method of this invention is comprised of the following steps. A water based viscous treating fluid composition is provided comprising water, a viscosity increasing polymer and an environmentally safe water soluble delayed polymer breaker that comprises a mixture of sodium perborate tetrahydrate and a solubility increasing boron complex or ester forming compound. The viscous treating fluid composition is introduced into a subterranean zone by way of an open-hole well bore penetrating it that has filter cake on the walls thereof. The delayed polymer breaker in the viscous treating fluid is then allowed to break the viscous treating fluid and the filter cake. Thereafter, the broken treating fluid and broken filter cake can be removed from the subterranean zone.

An environmentally safe water based treating fluid composition of this invention comprises water and a water soluble delayed polymer breaker comprising a mixture of sodium perborate tetrahydrate and a solubility increasing boron complex or ester forming compound. The treating fluid composition can also include a viscosity increasing polymer.

The objects, features and advantages of the present invention will be readily apparent to those skilled in the art upon a reading of the description of preferred embodiments which follows.

DESCRIPTION OF PREFERRED EMBODIMENTS

The water based treating fluid compositions of this invention can be utilized for forming gravel packs in a subterranean zone, for creating fractures in a subterranean zone and placing proppant particles therein or for carrying out other completion, stimulation or work over procedures. In gravel packing, fracturing or other applications in subterranean zones, water based treating fluid compositions are often utilized. In some of the applications, the treating fluid compositions must have a high density in order to prevent the flow of pressurized formation fluids into the well bores penetrating the subterranean zones. In those applications, the treating fluid compositions are often made up of salt water having a density in the range of from about 8.33 to about 15.5 pounds per gallon. The treating fluid compositions often must also have high viscosities which are provided by viscosity increasing polymers and when necessary, cross-linking agents. In order to recover the viscous treating fluid compositions from the subterranean zones, delayed polymer breakers are included in the fluids.

Sodium perborate tetrahydrate is an environmentally safe polymer breaker which is well suited for breaking viscous water based fluids. However, sodium perborate tetrahydrate has limited solubility in water. In accordance with the present invention, the solubility of sodium perborate tetrahydrate in fresh water or salt water is increased by combining a solubility increasing boron complex or ester forming compound with the sodium perborate tetrahydrate.

A method of this invention for treating a subterranean zone penetrated by a well bore using an environmentally safe water based viscous treating fluid composition comprises the following steps. A water based viscous treating fluid composition is provided comprising water, a viscosity increasing polymer and an environmentally safe water soluble delayed polymer breaker which comprises a mixture of sodium perborate tetrahydrate and a solubility increasing boron complex or ester forming compound. The viscous treating fluid composition is introduced in the subterranean zone by way of the well bore penetrating it and the delayed polymer breaker is allowed to break the viscous treating fluid into a thin fluid of reduced viscosity. Thereafter, the treating fluid can be recovered from the subterranean zone.

An environmentally safe water based treating fluid composition of this invention comprises water and a delayed polymer breaker comprising a mixture of sodium perborate tetrahydrate and a solubility increasing boron complex or ester forming compound.

As indicated above, the water utilized in the viscous fluid can be fresh water or salt water. Generally, salt is added to the water to provide clay stability and to increase the density of the water based fluid. Examples of salts that can be used include, but are not limited to, sodium chloride, sodium bromide, calcium chloride, potassium chloride, ammonium chloride and mixtures thereof. The salt or salts used can be present in the salt water in a concentration up to about 66% by weight thereof and the salt water can have a density up to about 15.5 pounds per gallon.

When a viscous treating fluid composition is utilized in accordance with this invention, various viscosity increasing polymers can be included in the treating fluid composition. A preferred group of viscosity increasing polymers include natural and derivatized polysaccharides which are soluble, dispersible or hydratable in an aqueous liquid to yield viscosity to the liquid. One group, for example, of polysaccharides which are suitable for use in accordance with the present invention includes galactomannan gums such as gum arabic, gum ghatti, gum karaya, tamarind gum, tragacanth gum, guar gum, locust bean gum and the like. The gums can also be characterized as having one or more functional groups such as cis-hydroxyl, hydroxyl, carboxyl, sulfate, sulfonate, amino or amide. Modified gums such as carboxyalkyl derivatives and hydroxyalkyl derivatives can also be employed.

Modified cellulose polymers and derivatives thereof can also be employed in accordance with the present invention. Examples of water-soluble cellulose ethers which can be used include, but are not limited to, carboxyethylcellulose, carboxymethylcellulose, carboxymethylhydroxyethylcellulose, hydroxyethylcellulose, hydroxypropylcellulose, and biopolymers such as xanthan and succinoglycon.

Of the viscosity increasing polymers that can be utilized, hydroxypropylguar, carboxymethylhydroxypropylguar, hydroxyethylcellulose, carboxymethylhydroxyethylcellulose, carboxymethylcellulose, xanthan and succinoglycon are preferred. The most preferred viscosity increasing polymer is hydroxyethylcellulose. The polymer used is generally present in the viscous fluid compositions in an amount in the range of from about 0.25% to about 1.5% by weight of the water in the compositions.

As indicated above, in order to increase the viscosity of the viscous fluid compositions beyond that obtainable by the presence of a polymer alone, a cross-linking agent for cross-linking the polymer can be included in the compositions. Examples of cross-linking agents which can be utilized include, but are not limited to, borate releasing compounds, zirconium releasing compounds and titanium releasing compounds. When used, the cross-linking agent is included in the viscous fluid compositions in an amount in the range of from about 0.25% to about 1.5% by weight of water in the compositions.

Examples of the solubility increasing boron complex or ester forming compounds that can be used in accordance with this invention include, but are not limited to, polyhydroxyls such as mannitol, mannose, galactose and glycerol; complex or ester forming organic acids such as citric acid and tartaric acid; complex or ester forming inorganic compounds such as alkali polyphosphates; phenols having attached polyhydroxyls; polymers such as xanthan and guar; and natural materials such as pectin, glycolipids and glycoproteins. Of these, mannitol is preferred.

The delayed polymer breaker mixture of this invention has a molar ratio of sodium perborate tetrahydrate to the solubility increasing boron complex or ester forming compound utilized in the range of from about 1:1 to about 1:6. The preferred mixture comprised of sodium perborate tetrahydrate and mannitol has a molar ratio of sodium perborate tetrahydrate to mannitol of about 1:2. The delayed polymer breaker is generally included in the water based viscous or non-viscous treating fluid compositions of this invention in an amount in the range of from about 0.1% to about 5% by weight of the water in the compositions.

Suspended particulate solids such as gravel for forming gravel packs and proppant particles for propping fractures can be included in the water based viscous treating fluid compositions. The gravel or proppant particles are suspended in a viscous treating fluid composition and are deposited in a subterranean zone when the viscosity of the viscous treating fluid composition is broken. Examples of useful particulate solids include, but are not limited to, graded sand, bauxite, ceramic materials, glass materials, walnut hulls, polymer beads and the like. Of the various particulate solids that can be used, graded sand is generally preferred.

A preferred method of this invention for treating a subterranean zone penetrated by a well bore comprises the steps of: (a) providing a water based viscous treating fluid composition comprising water, a viscosity increasing polymer and a water soluble delayed polymer breaker that comprises a mixture of sodium perborate tetrahydrate and a solubility increasing boron complex or ester forming compound; (b) introducing the viscous treating fluid composition into the subterranean zone by way of the well bore penetrating it; and (c) allowing the delayed polymer breaker to break the viscous treating fluid composition into a thin fluid of reduced viscosity so that it can be removed from the subterranean zone.

Another preferred method of treating a subterranean zone penetrated by an open hole well bore having filter cake on the walls thereof comprises the steps of: (a) providing a water based non-viscous treating fluid composition comprising water and a water soluble delayed polymer breaker that comprises a mixture of sodium perborate tetrahydrate and a solubility increasing boron complex or ester forming compound; (b) introducing the non-viscous treating fluid composition into the subterranean zone by way of the open hole well bore penetrating it that has filter cake on the walls thereof; and (c) allowing the delayed polymer breaker to break the filter cake so that the treating fluid and the broken filter cake can be removed from the subterranean zone.

Yet another preferred method of treating a subterranean zone penetrated by an open hole well bore having filter cake on the walls thereof using an environmentally safe water based viscous fluid comprises the steps of: (a) providing a water based viscous treating fluid composition comprising water, a viscosity increasing polymer and a water soluble delayed polymer breaker that comprises a mixture of sodium perborate tetrahydrate and a solubility increasing boron complex or ester forming compound; (b) introducing the viscous treating fluid composition into the subterranean zone by way of the open hole well bore penetrating it that has filter cake on the walls thereof; and (c) allowing the delayed polymer breaker in the viscous treating fluid to break the viscous treating fluid and the filter cake so that the broken treating fluid and the broken filter cake can be removed from the subterranean zone.

A preferred method of fracturing a subterranean zone penetrated by a well bore using an environmentally safe viscous fracturing fluid composition comprises the steps of: (a) providing a viscous fracturing fluid composition comprising water, a viscosity increasing polymer and a delayed polymer breaker comprised of a mixture of sodium perborate tetrahydrate and a solubility increasing boron complex or ester forming compound; (b) pumping the fracturing fluid composition into the subterranean zone by way of the well bore at a rate and pressure sufficient to form one or more fractures in the subterranean zone; (c) suspending proppant particles in the fracturing fluid composition; and (d) allowing the delayed polymer breaker to break the fracturing fluid composition into a thin fluid of reduced viscosity whereby the proppant particles are deposited in the fractures formed in the subterranean zone.

A preferred environmentally safe water based treating fluid composition of this invention comprises: water and a delayed polymer breaker comprising a mixture of sodium perborate tetrahydrate and a solubility increasing boron complex or ester forming compound.

Another preferred environmentally safe water based treating fluid composition comprises: water, a viscosity increasing polymer and a delayed breaker comprising a mixture of sodium perborate tetrahydrate and a solubility increasing boron complex or ester forming compound.

In order to further illustrate the methods of this invention, the following examples are given.

EXAMPLE

Sodium perborate tetrahydrate solubility tests in fresh water having a density of 8.33 pounds per gallon were conducted. The water had a temperature of 75° F. and amounts of various mixtures of sodium perborate tetrahydrate and several different solubility increasing boron complex or ester forming compounds were added to the water with mixing. The sodium borate tetrahydrate-complex or ester forming compound mixtures all contained a molar ratio of sodium perborate tetrahydrate to the complex or ester forming compound of 1:2, and the mixtures were added to the water in amounts whereby the sodium perborate tetrahydrate was present in an amount of 10% by weight of the water.

The results of these tests are given in the Table below.

TABLE

Solubility of Sodium Perborate Tetrahydrate in Water

| Test No. | Solute | Amount Dissolved, % by weight of water | Time Required, min |
| --- | --- | --- | --- |
| 1. | Sodium Perborate Tetrahydrate | 2.5% | <15 |
| 2. | 1:2 Molar Ratio of Sodium Perborate Tetrahydrate and Mannitol | 10%[1] | <15 |
| 3. | 1:2 Molar Ratio of Sodium Perborate Tetrahydrate and Mannose | 10% | <15 |
| 4. | 1:2 Molar Ratio of Sodium Perborate Tetrahydrate and Galactose | 10% | <15 |
| 5. | 1:4 Molar Ratio of Sodium Perborate Tetrahydrate and Glycerol | 10% | <15 |

[1]10% by weight of water was not the maximum solubility. It was used in the tests as a pass/fail target.

From the above Table it can be seen that the mixtures of sodium perborate tetrahydrate and boron complex or ester forming compounds produced significantly greater sodium perborate tetrahydrate solubility than the 2.5% by weight natural solubility.

Thus, the present invention is well adapted to carry out the objects ends and advantages mentioned as well as those which are inherent therein. While numerous changes may be made by those skilled in the art, such changes are encompassed within the spirit of this invention as defined by the appended claims.

What is claimed is:

1. A method of treating a subterranean zone penetrated by a well bore comprising the steps of:

(a) providing a water based viscous treating fluid composition comprising water, a viscosity increasing polymer and a water soluble delayed polymer breaker that comprises a mixture of sodium perborate tetrahydrate and a solubility increasing boron complex or ester forming compound;

(b) introducing said viscous treating fluid composition into said subterranean zone by way of said well bore penetrating it; and (c) allowing said delayed polymer breaker to break said viscous treating fluid composition into a thin fluid of reduced viscosity so that it can be removed from said subterranean zone.

2. The method of claim 1 wherein said solubility increasing boron complex or ester forming compound is selected from the group consisting of mannitol, mannose, galactose, glycerol, citric acid, tartaric acid, alkali polyphosphates, phenols with attached polyhydroxyls, xanthan, guar, pectin, glycolipids and glycoproteins.

3. The method of claim 1 wherein said solubility increasing boron complex or ester forming compound is mannitol.

4. The method of claim 1 wherein said delayed polymer breaker mixture has a molar ratio of sodium perborate tetrahydrate to said solubility increasing boron complex or ester forming compound in the range of from about 1:1 to about 1:6.

5. The method of claim 1 wherein said delayed polymer breaker mixture has a molar ratio of sodium perborate tetrahydrate to said solubility increasing boron complex or ester forming compound of about 1:2.

6. The method of claim 1 wherein said delayed polymer breaker mixture is present in said viscous treating fluid composition in an amount in the range of from about 0.1% to about 5% by weight of water in said viscous treating fluid composition.

7. The method of claim 1 wherein said water is fresh water or salt water.

8. The method of claim 1 wherein said water is salt water having a density up to about 15.5 pounds per gallon.

9. The method of claim 1 wherein said viscosity increasing polymer is a polysaccharide having one or more functional groups such as cis-hydroxyl, hydroxyl, carboxyl, sulfate, sulfonate, amino or amide.

10. The method of claim 1 wherein said viscosity increasing polymer is selected from the group consisting of guar and derivatives thereof, modified celluloses and derivatives thereof and xanthan and succinoglycon biopolymers.

11. The method of claim 1 wherein said viscosity increasing polymer is hydroxyethylcellulose.

12. The method of claim 1 wherein said viscosity increasing polymer is present in said viscous treating fluid composition in an amount in the range of from about 0.25% to about 1.5% by weight of water in said viscous treating fluid composition.

13. The method of claim 1 wherein said viscous treating fluid composition further comprises a cross-linking agent for cross-linking said viscosity increasing polymer.

14. The method of claim 13 wherein said cross-linking agent is selected from the group consisting of borate releasing compounds, zirconium releasing compounds and titanium releasing compounds.

15. The method of claim 13 wherein said cross-linking agent is present in said viscous treating fluid composition in an amount in the range of from about 0.25% to about 1.5% by weight of water in said viscous treating fluid composition.

16. The method of claim 1 which further comprises the step of suspending particulate solids in said viscous treating fluid composition which are deposited in said subterranean zone.

17. The method of claim 16 wherein said particulate solids are graded sand.

18. A method of treating a subterranean zone penetrated by an open hole well bore having filter cake on the walls thereof comprising the steps of:

(a) providing a water based non-viscous treating fluid composition comprising water and a water soluble delayed polymer breaker that comprises a mixture of sodium perborate tetrahydrate and a solubility increasing boron complex or ester forming compound;

(b) introducing said non-viscous treating fluid composition into said subterranean zone by way of said open-hole well bore penetrating it that has filter cake on the walls thereof; and (c) allowing said delayed polymer breaker to break said filter cake so that said treating fluid and the broken filter cake can be removed from said subterranean zone.

19. The method of claim 18 wherein said solubility increasing boron complex or ester forming compound is selected from the group consisting of mannitol, mannose, galactose, glycerol, citric acid, tartaric acid, alkali polyphosphates, phenols with attached polyhydroxyls, xanthan, guar, pectin, glycolipids and glycoproteins.

20. The method of claim 18 wherein said solubility increasing boron complex or ester forming compound is mannitol.

21. The method of claim 18 wherein said delayed polymer breaker mixture has a molar ratio of sodium perborate tetrahydrate to said solubility increasing boron complex or ester forming compound in the range of from about 1:1 to about 1:6.

22. The method of claim 18 wherein said delayed polymer breaker mixture has a molar ratio of sodium perborate tetrahydrate to said solubility increasing boron complex or ester forming compound of about 1:2.

23. The method of claim 18 wherein said delayed polymer breaker mixture is present in said non-viscous treating fluid composition in an amount in the range of from about 0.1% to about 5% by weight of water in said non-viscous treating fluid composition.

24. The method of claim 18 wherein said water is fresh water or salt water.

25. The method of claim 18 wherein said water is salt water having a density up to about 15.5 pounds per gallon.

26. A method of treating a subterranean zone penetrated by an open hole well bore having filter cake on the walls thereof comprising the steps of:

(a) providing a water based viscous treating fluid composition comprising water, a viscosity increasing polymer and a water soluble delayed polymer breaker that comprises a mixture of sodium perborate tetrahydrate and a solubility increasing boron complex or ester forming compound;

(b) introducing said viscous treating fluid composition into said subterranean zone by way of said open hole well bore penetrating it that has filter cake on the walls thereof;

(c) allowing said delayed polymer breaker in said viscous treating fluid to break said viscous treating fluid and said filter cake so that the broken treating fluid and the broken filter cake can be removed from said subterranean zone.

27. The method of claim 26 wherein said solubility increasing boron complex or ester forming compound is selected from the group consisting of mannitol, mannose, galactose, glycerol, citric acid, tartaric acid, alkali polyphosphates, phenols with attached polyhydroxyls, xanthan, guar, pectin, glycolipids and glycoproteins.

28. The method of claim 26 wherein said solubility increasing boron complex or ester forming compound is mannitol.

29. The method of claim 26 wherein said delayed polymer breaker mixture has a molar ratio of sodium perborate tetrahydrate to said solubility increasing boron complex or ester forming compound in the range of from about 1:1 to about 1:6.

30. The method of claim 26 wherein said delayed polymer breaker mixture has a molar ratio of sodium perborate tetrahydrate to said solubility increasing boron complex or ester forming compound of about 1:2.

31. The method of claim 26 wherein said delayed polymer breaker mixture is present in said viscous treating fluid composition in an amount in the range of from about 0.1% to about 5% by weight of water in said viscous treating fluid composition.

32. The method of claim 26 wherein said water is fresh water or salt water.

33. The method of claim 26 wherein said water is salt water having a density up to about 15.5 pounds per gallon.

34. The method of claim 26 wherein said viscosity increasing polymer is a polysaccharide having one or more functional groups such as cis-hydroxyl, hydroxyl, carboxyl, sulfate, sulfonate, amino or amide.

35. The method of claim 26 wherein said viscosity increasing polymer is selected from the group consisting of guar and derivatives thereof, modified celluloses and derivatives thereof and xanthan and succinoglycon biopolymers.

36. The method of claim 26 wherein said viscosity increasing polymer is hydroxyethylcellulose.

37. The method of claim 26 wherein said viscosity increasing polymer is present in said viscous treating fluid composition in an amount in the range of from about 0.25% to about 1.5% by weight of water in said viscous fluid composition.

38. The method of claim 26 wherein said treating fluid further comprises a cross-linking agent for cross-linking said viscosity increasing polymer.

39. The method of claim 38 wherein said cross-linking agent is selected from the group consisting of borate releasing compounds, zirconium releasing compounds and titanium releasing compounds.

40. The method of claim 39 wherein said cross-linking agent is present in said viscous treating fluid in an amount in the range of from about 0.25% to about 1.5% by weight of water in said viscous fluid composition.

41. The method of claim 26 which further comprises the step of suspending gravel in said viscous treating fluid which is deposited in said subterranean zone.

42. The method of claim 41 wherein said gravel is graded sand.

* * * * *